(12) United States Patent
DeLuca

(10) Patent No.: US 6,222,514 B1
(45) Date of Patent: *Apr. 24, 2001

(54) FAULT TOLERANT INTERSECTING BEAM DISPLAY PANEL

(76) Inventor: Michael J. DeLuca, 734 Camino Gardens La., Boca Raton, FL (US) 33432

(*) Notice: Subject to any disclaimer, the term of this patent is extended or adjusted under 35 U.S.C. 154(b) by 0 days.

This patent is subject to a terminal disclaimer.

(21) Appl. No.: 09/306,328

(22) Filed: May 6, 1999

Related U.S. Application Data

(63) Continuation-in-part of application No. 09/301,470, filed on Apr. 28, 1999, which is a continuation-in-part of application No. 08/872,262, filed on Jun. 10, 1997, now Pat. No. 6,031,511.

(51) Int. Cl.[7] .......................................... G06G 3/34
(52) U.S. Cl. ................. 345/84; 345/55; 359/326
(58) Field of Search ................. 345/55, 88, 102, 345/65, 84, 93, 74, 76; 348/752, 754, 762, 763, 767, 768; 362/84

(56) References Cited

U.S. PATENT DOCUMENTS

| | | |
|---|---|---|
| 3,829,838 | 8/1974 | Lewis et al. . |
| 4,578,709 | 3/1986 | Lang et al. . |
| 4,766,424 | 8/1988 | Adler et al. . |
| 4,870,485 | 9/1989 | Downing et al. . |
| 5,008,890 | 4/1991 | McFarlane . |
| 5,075,674 | * 12/1991 | Katayama et al. ............ 345/93 |
| 5,170,156 | 12/1992 | Demond et al. . |
| 5,214,419 | 5/1993 | Demond et al. . |
| 5,245,623 | 9/1993 | McFarlane . |
| 5,283,563 | 2/1994 | Allen et al. . |
| 5,381,310 | 1/1995 | Brotz . |
| 5,684,621 | 11/1997 | Downing . |
| 5,764,403 | 6/1998 | Downing . |
| 5,914,807 | 6/1999 | Downing . |

OTHER PUBLICATIONS

Schewe, P. F., Physics News Update, The American Institute of Physics News, Number 285, Sep. 9, 1996.

(List continued on next page.)

*Primary Examiner*—Kent Chang
(74) *Attorney, Agent, or Firm*—IdeoCo. com

(57) ABSTRACT

A two dimensional display panel produces a time variable image composed of light emitting pixels. The pixels are generated by a light emitting phosphor distributed within the panel, the pixels radiate light in response to being excited by charging and triggering energy beams. The energy beams are relatively invisible and may be generated by lasers or solid state diode energy sources. Wave guides within the panel direct the energy beams to the pixels. The wave guides may be composed of fiber optic threads and the display panel comprised of a fabric of woven fiber optic threads wherein pixels are produced at intersections of the woven fiber optic threads. The brightness of the pixels are controlled by regulating the duty cycle of a column driver relative to the duty cycle of a row driver. The display energy beams are driven to facilitate interface with a pen-like pointing device. In one embodiment the pen receives relatively invisible energy beams and in another embodiment the pen receives visible pixel light. In another embodiment, the invention has redundant energy beam sources and driving circuitry in order improve display system reliability.

19 Claims, 6 Drawing Sheets

OTHER PUBLICATIONS

Crystal Cube, 3–D Technology Laboratory's Three Dimensional Cube Display, Discover Magazine, Jul. 1997.

Winters, J., Cube Tube, Discover Magazine, Dec., 1996.

J.D. Lewis et al., "A True Three–Dimensional Display," IEEE Trans. Electron. Dev., vol. ED–18, No. 9, Sep. 1971, pp. 724–731.

Downing, E. et al., "A Three–Color, Solid State, Three–Dimensional Display," Science, vol. 273, pp. 1185–1189, Aug. 30, 1996.

Downing, E. et al., "A Laser Diode Driven Solid State, Three–Dimensional Display," http://www.stanford.edu/group/CNOM/AnnualReport95/SecD/D.1.pfd, Apr. 18, 1996.

* cited by examiner

FAULT TOLERANT INTERSECTING BEAM DISPLAY PANEL

REFERENCE TO RELATED APPLICATIONS

This is a continuation-in-part of U.S. patent application Ser. No. 09/301,470 filed Apr. 28, 1999 entitled Pixel Brightness Control for and Intersecting Beam Phosphorous Display which is a continuation-in part of U.S. patent application Ser. No. 08/872,262 filed Jun. 10, 1997 now U.S. Pat. No. 6,031,511.

FIELD OF THE INVENTION

The present invention pertains to a system for producing images, and more particularly, to a display system having redundant components.

BACKGROUND OF THE INVENTION

Television receivers and other display systems use a cathode ray tube having a fluorescent coating deposited on a slightly curved screen inside the tube. In a black and white tube an electron gun directs a beam of electrons toward the screen with the electron beam being scanned over the surface of the screen by vertical and horizontal deflection systems. A control grid varies the amount of current in the beam to vary the brightness of different areas on the screen. In a color tube a trio of beams are each intensity controlled and each beam is directed toward one of three colors of phosphor on the screen. However, in both black and white and in color television the image can be viewed only from the front of the screen, which is opposite from the side of the screen containing the phosphor. Further, the electron gun requires that a cathode ray tube display system be thick. And still further, the display is constructed of a rigid glass to facilitate direction of the electron beam upon the phosphor.

More recent flat panel displays have significantly reduced the thickness of display systems. Liquid Crystal Display (LCD) systems require individually electrically addressable pixels on the display surface which are switched between transparent and opaque states. The pixels gate light generated typically from an electroluminescence light panel in order to generate the display. Such displays require complex circuitry to activate each pixel, and are visible typically from the side opposite to the electroluminescence panel.

U.S. Pat. No. 4,870,485 to Downing; Elizabeth A., et. al., Sep. 26, 1989, entitled: THREE DIMENSIONAL IMAGE GENERATING APPARATUS HAVING A PHOSPHOR CHAMBER, hereby incorporated by reference, describes a three dimensional image generating apparatus having a three dimensional image inside an image chamber. Such a system has been publicly demonstrated. An imaging phosphor distributed through the image chamber is excited by a pair of intersecting laser beams which cause the phosphor to emit visible light and form an image as the intersecting beams move through the image chamber. The imaging phosphor is a rapidly-discharging, high conversion efficiency, electron trapping type which stores energy from a charging energy beam for a very short time, such as a few microseconds. The imaging phosphor releases photons of visible light when energy from a triggering energy beam reaches phosphor containing energy from the charging beam. This triggering results in radiation of visible light from each point where the charging energy beam crosses the triggering energy beam. A first scanning system directs the charging energy beam to scan through a space in the image chamber and a second scanning system directs the triggering energy beam to scan through space in the image chamber. These two energy beams intersect at a series of points in space to produce a three dimensional image inside the image chamber. The energy beams are provided by a pair of lasers with one beam in the infrared region and the other in the blue, green, or ultraviolet portion of the spectrum. However, an electromechanical mirror based beam steering mechanism makes the display bulky, subject to vibration of the display and the glass cube is rigid.

Thus, what is needed is a thin flexible display panel having multi-color light generating pixels which may be viewed from either side of the panel and requires no moving parts to generate the display. Furthermore, what is need is a method and apparatus for controlling the brightness of pixels comprised within such a display.

Pen-link pointing devices are used in many applications to facilitate a user's interface with a computer via the computer display and are currently widely used in hand held personal computers (HPC). Other applications use CRT displays for such an interface. Most pen pointing devices require a means separate from the display to determine the location of the pen or other pointing device relative to the display. In most HPCs, the separate means takes the embodiment of a touch sensitive film placed over the display.

These films add cost to the product and provide an additional opportunity for failure of the device. Flexible LCDs are being produce for additional display applications and further complicates the use of a pointing device in conjunction with the display because touch sensitive film tends to falsely respond to flexing of the display. Furthermore, most current displays, including LCDs and CRTs are fragile and require a clear protective layer, such as a resilient plastic or glass be placed between the display surface and a pen-like pointing device in order to protect the display from damage by the pen-like pointing device. This additional protective layer separates the tip of the pointing device from the display increasing a parallax affect from the perspective of the user. Thus, what is needed is a display and a pen-like pointing device that can be used without additional locating means such as a touch sensitive film, and that reduces parallax when used.

There are many display applications where fault tolerance and high reliability are essential. Such applications include medical, military, aircraft and spacecraft applications where a failure of a display may prove critical or even fatal. The reliability of many systems is improved by adding redundancy, that is duplicating active circuitry wherein redundant circuitry continues operating in event of failure. Redundant display technology is exceedingly difficult to realize in ordinary CRT and LCD applications because of the characteristics of the display technology. Thus, what is needed is a display system having redundant active components capable of continuing operation of the display system in the event of failure of active components of the system.

SUMMARY OF THE INVENTION

A display apparatus comprises a panel having a display surface surrounded by an edge and an imaging phosphor therein. A first source for radiating a first energy beam enters through a first portion of the edge, a second source for radiating a second energy beam enters through a second portion of the edge, and a third source for radiating a third energy beam enters through a third portion of the edge. A first pixel of visible light energy is released by the imaging phosphor at an intersection of the first and third energy beams, and a second pixel of visible light energy is released by the imaging phosphor at an intersection of the second and the third energy beams, the first and second pixels of visible light having a substantially constant location on the display surface. Pixel brightness may be varied by varying the timing of the energy beams.

It is an object of this invention to provide a method for driving an intersecting beam display comprising the steps of sequentially enabling radiation of each of a plurality of substantially non-intersecting energy beams from a first source, and thereafter sequentially enabling radiation of each of a plurality of substantially non-intersecting energy beams from a second source wherein energy beams from the first source intersect with energy beams from the second source.

It is an object of this invention to provide a pointing device for indicating a location on an intersecting beam display radiated by a multiplicity of beams having first and second wavelengths to produce pixels of light having at least a third wavelength comprising a first determining means for determining reception of radiation at the first wavelength, and a second determining means for determining reception of radiation of the second wavelength.

It is an object of this invention to provide a method of driving an intersecting beam display comprising the steps of: radiating a first energy beam into an intersection; radiating a redundant energy beam into the intersection; and radiating a third energy beam into the intersection, wherein a first pixel of visible light occurs at an intersection of the first, redundant and third energy beams and the first pixel of visible light occurs independent of a failure of either the first or redundant energy beams.

BRIEF DESCRIPTION OF THE DRAWINGS

FIG. 1 also shows a display apparatus having redundant switching means, redundant row sources, and redundant column sources.

FIG. 2 shows a display apparatus having a panel composed of orthogonal layers of parallel wave guides having reflectors at an end and an imaging phosphor layer interposed between.

FIG. 3 shows an intersection of two wave guides of FIG. 2 and the imaging phosphor there between.

DETAILED DESCRIPTION OF THE INVENTION

This is a continuation-in-part of U.S. patent application Ser. No. 09/301,470 filed Apr. 28, 1999 entitled Pixel Brightness Control for and Intersecting Beam Phosphorous Display which is a continuation-in-part of U.S. patent application Ser. No. 08/872,262 filed Jun. 10, 1997, both are hereby incorporated by reference.

Figure 1:
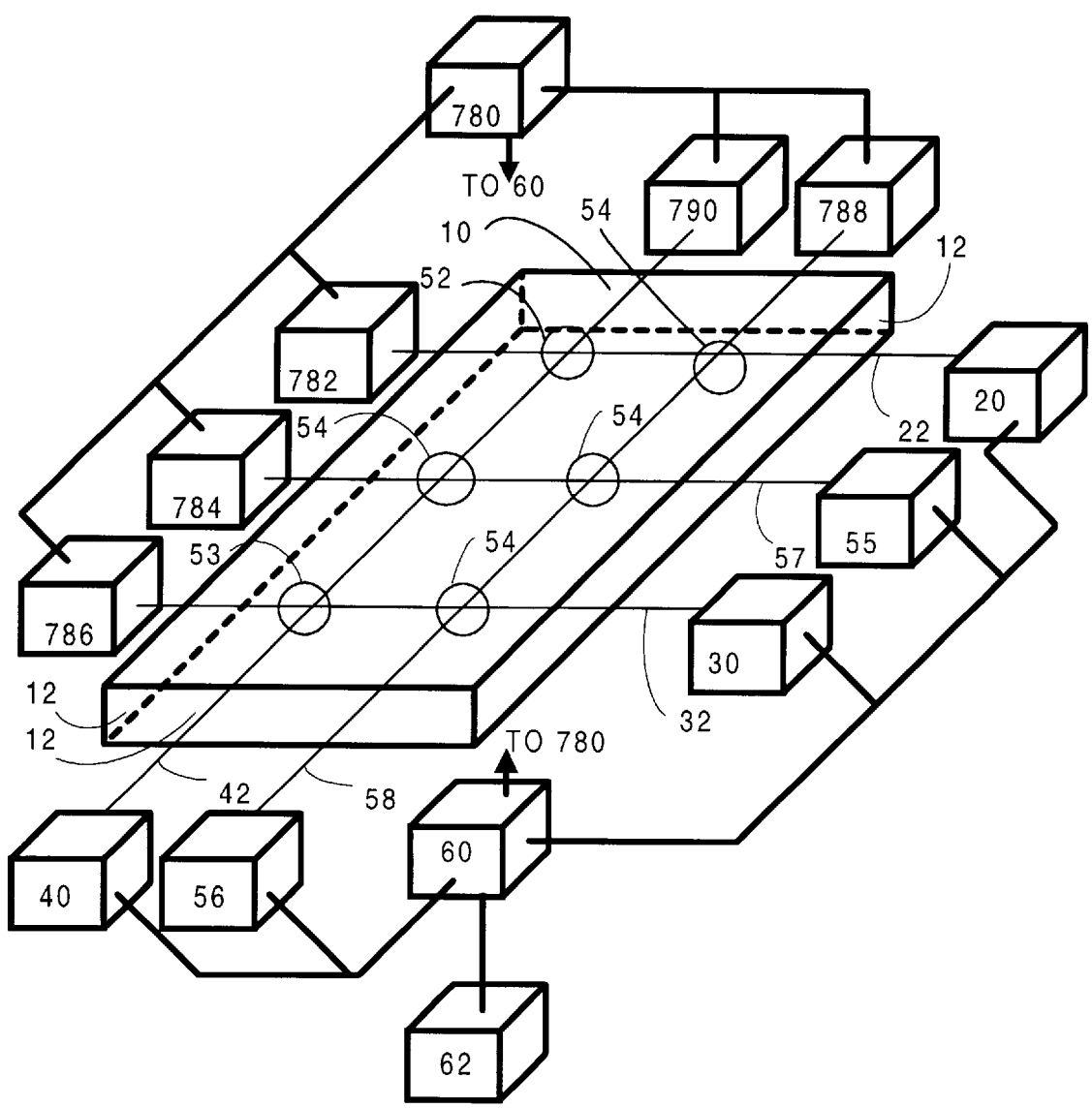
FIG. 1 shows a display apparatus having a display panel excited by sources radiating energy beams.

FIG. 1 shows a display apparatus having a display panel excited by sources radiating energy beams. The display panel 10 has an edge 12 surrounding it on all sides. The display panel is preferably substantially transparent to visible light and has imaging phosphor distributed therein. A first source 20 radiates a first energy beam 22 into a first portion of edge 12. A second source 30, preferably having a wavelength substantially similar to that of source 20, emits a second energy beam 32 into a second portion of edge 12. A third source 40, preferably having a different wavelength from sources 20 and 30, radiates a third energy beam 42 into a third portion of edge 12.

Sources 20 and 30 may represent either triggering or charging energy beams and source 40 may represent either a charging or triggering energy beam respectively, such that the imaging phosphor releases visible light energy when energy from a triggering energy beam reaches phosphor containing energy from a charging energy beam.

A first pixel of visible light energy 52 is released by the imaging phosphor at intersection of the first energy beam 22 and the third energy beam 42, and a second pixel of visible light energy 53 is released by the imaging phosphor at intersection of the second energy beam 32 and the third energy beam 42. The first and second pixels of visible light have a substantially constant location on the display surface of panel 10. Numerous additional pixels 54 may be added by adding additional sources including sources 55 and 56. Sources 20, 30, 40, 55 and 56 may be realized by lasers or solid state diodes emitting energy beams at appropriate charging and triggering wavelengths.

A switching means 60 is coupled to at least the first, second and third sources, 20, 30 and 40. The switching means is responsive to a display generator 62 which generates a display signal for selectively activating at least the first and second pixels, 52 and 53. Display generator 62 may be any of numerous display generators known in the art including either a television receiver or a personal computer. The switching means 60 enables the first and third energy beams 22 and 42 in response to the display signal indicating activation of the first pixel 52, and enables the second and third energy beams 32 and 42 in response to the display signal indicating activation of the second pixel 53. The switching means 60 enables the first, second and third energy beams, 22, 32 and 42 in response to the display signal indicating activation of the first and second pixels 52 and 53. Activation of a energy beam may be either by providing energizing power to its respective source, or a switching a shutter at the output of the respective source. Numerous additional pixels 54 may be selectively activated by coupling switching means 60 to additional sources, such as sources 55 and 56 and enabling the respective energy beams in a corresponding way.

The display apparatus of FIG. 1 has an advantage in that the alignment of panel 10 relative to sources 20, 30, 40, 55 and 56 is not critical so long as the corresponding energy beams are radiated within panel 10. The pixel location is defined by the intersection of the energy beams within the panel, not necessarily the alignment of the panel relative to the sources. This has the advantage of reducing precision manufacturing of the display apparatus. Further, panel 10 can be a relatively thin layer of glass or flexible plastic, and since no electrical wiring connection is necessary within the panel to activate pixels, the cost of the panel may be significantly reduced. Since the pixel density and display size is determined by the number and placement of the sources, and since the sources may be made from low cost high density solid state diodes, a large size, high pixel density flat panel display can be made. Since each pixel radiates light out of either surface of the panel, a display produced by the display apparatus may be viewed from either side of the panel.

Figure 2:
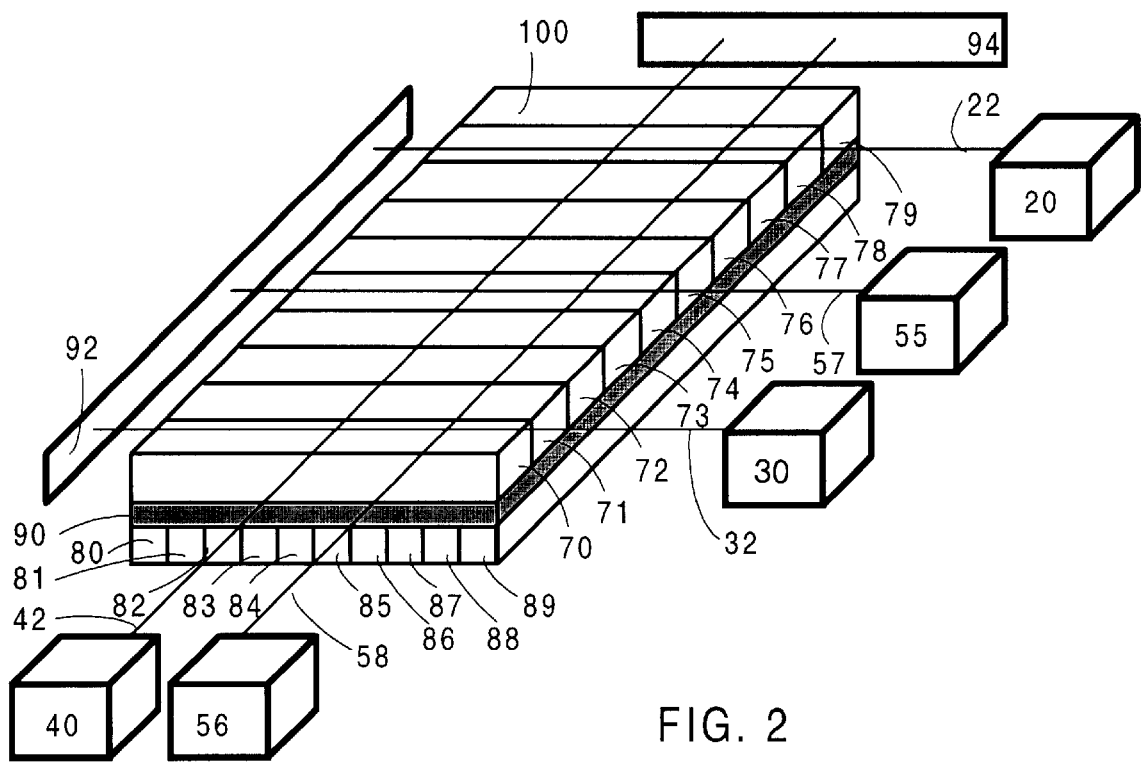

FIG. 2 shows a display apparatus having a panel composed of orthogonal layers of parallel wave guides having reflectors at an end and an imaging phosphor layer interposed between. Panel 100 comprises a first layer having a first multiplicity of substantially parallel wave guides 70–79, for channeling energy beams 22, 32 and 57, and a second layer having a second multiplicity of substantially parallel wave guides for channeling energy beams 42 and 58. The wave guides limit dispersion of the energy beams within the layer with a smooth internally reflective surface which enables internal reflection of energy beams thereby also limiting dispersion and intersection of energy beams within the layer. The layers of FIG. 2 may be comprised of numerous laminated fiber optic pipes. An imaging phosphor layer 90 interposed between the first layer 70–79 and second layer 80–88 has the imaging phosphor distributed there through. Sources 20, 30 and 55 are coupled to apertures at one end of the wave guides of the first layer 70–79 and reflector 92 is coupled to apertures at the other end of the wave guides 70–79. Sources 40 and 56 are coupled to apertures at one end of the wave guides 80–88 of the second layer and a reflector 94 is coupled to apertures at the other end. While the sources 20, 30, 40, 55 and 57 and reflectors 92 and 94 are shown a distance from their respective layers for illustrative purposes, they are preferably attached to apertures at the end of the wave guides of the perspective layers.

In FIG. 2, source 20 radiates and energy beam 22 substantially into wave guide 78, source 30 radiates energy beam 32 substantially into wave guide 71, source 40 radiates energy beam 42 substantially into wave guide 82, source 55 radiates energy beam 57 substantially into wave guide 75, and source 56 radiates energy beam 58 substantially into wave guide 85. The panel of FIG. 2 maintains the advantage that the alignment of the sources with the panel is not critical because a pixel of light is formed at an intersection of the energy beams. For example, energy beam 32 could be conducted not only by wave guide 71, but by adjacent wave guides 70 or 72 without interference from adjacent energy beam 57 and while further maintaining substantially constant pixel location on the surface of panel 100. The panel of FIG. 2 has the further advantage in that if the energy beams have a tendency to disperse or spread out as they travel further from the source, the wave guide will tend to limit the dispersion to within itself. Thus, a pixel generated farther from the source, will have substantially the same size as a pixel generated close to the source because the size is substantially determined by the dimensions of the wave guide rather than the dispersion characteristics of the charging and triggering energy beams.

The panel of FIG. 2 has a further advantage in that the reflector at the end of the wave guide tends to compensate for any attenuation of the energy beam by the wave guide. The sum of the power of energy beam originated from the source plus the power of the energy beam reflected by the reflector should result in a more constant distribution of power through the wave guide. This will help assure a more even brightness of pixels across the panel.

Another advantage of the panel of FIG. 2 is that the parallel nature of the wave guides reduces the requirement of parallel alignment of energy beams generated by the sources of one layer relative to each other, for example the parallel alignment of energy beams 22, 32 and 57 relative to each other, and energy beams 42 and 58 relative to each other necessary to produce evenly spaced pixels is reduced because the wave guides tend to assure the parallel nature of the energy beams even though the respective sources may not accurately generate parallel energy beams. Furthermore, the orthogonal alignment of energy beams of the two layers is reduced, for example the intersection of wave guides 70–79 with wave guides 80–88 assure an evenly space matrix of pixels without a critical orthogonal alignment of energy beams 22, 32 and 57 with energy beams 42 and 58. This should significantly reduce precision manufacturing of the invention. Further, wave guides 70–79 and 80–88 may be made of an identical laminated optic material and rotated 90 degrees at the time of assembly.

Figure 3:
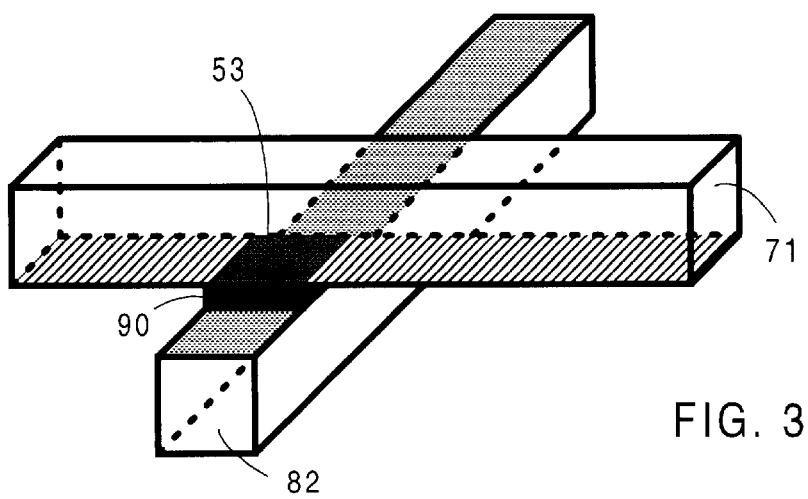

FIG. 3 shows an intersection of two wave guides of FIG. 2 and the imaging phosphor there between. Wave guide 71, which conducts energy beam 32 intersects with wave guide 82 which conducts energy beam 42. Wave guides 71 and 82 may be representative of all wave guides of FIG. 2. Wave guides 71 and 82 are shown to have hash marks or a shaded side on one surface indicating that surface is etched or made unsmooth to facilitate the energy beam of the wave guide to intersect with energy beams of wave guides of other layers. The remaining surface of the wave guide is smooth to facilitate internal reflection of an energy beam within the wave guide. As energy beam 32 it transmitted through the etched surface of wave guide 71, it intersects with portions of energy beam 42 transmitted through the etched surface of wave guide 82. At intersection 53 of both wave guides, the imaging phosphor layer 90 receives radiation from both charging and triggering energy beams and thus illuminates visible light. This produces a pixel having a well defined location on the surface of panel 100 of FIG. 2 due to the orthogonal relationship of the wave guides.

In alternate embodiments, the phosphor of the imaging phosphor layer could be incorporated into either or both the wave guides layers, thereby eliminating the need for a separate imaging phosphor layer. Furthermore color displays may be made by stacking multiple panels 100 and their associated energy beam sources, each panel capable of generating a different color of light. For example three panels, having red, green and blue pixels respectively, would produce colors commonly used in television and personal computer applications.

Alternately, individual wave guides could cause generation of pixels of various colors: a first compound would be distributed within one wave guide for generating a first pixel with a first color of visible light energy and a second compound distributed within another wave guide for generating the second pixel with a second color of visible light energy. For example, each wave guide could have a compound to filter light color generated by the imaging phosphor layer. For example, wave guide 78 could be tinted to allow red light to pass, while wave guide 74 could be tinted to allow green light to pass and wave guide 71 could be tinted to allow blue light to pass. In such a case, the intervening wave guides 70, 72, 73, 75, 76, 77 and 79 could be eliminated, combined or made redundant to an appropriate adjacent wave guide. In another example, imaging phosphor compounds could be made to generate predominantly one color of light and then dispersed through a wave guide. For example, a red imaging phosphor could be distributed in wave guide 78, a green imaging phosphor distributed in wave guide 74 and a blue imaging phosphor distributed in wave guide 71, this allows both the generation of color pixels and the illumination of imaging phosphor layer 90. Finally the energy beams themselves could be modified to make a common phosphor generate various colors of light pixels. Thus, red, green and blue pixels may be generated, allowing the display panel to generate color displays. The intensity of each pixel may be varied by varying the intensity or duration of either the charging or triggering energy beam, or both.

Figure 4:
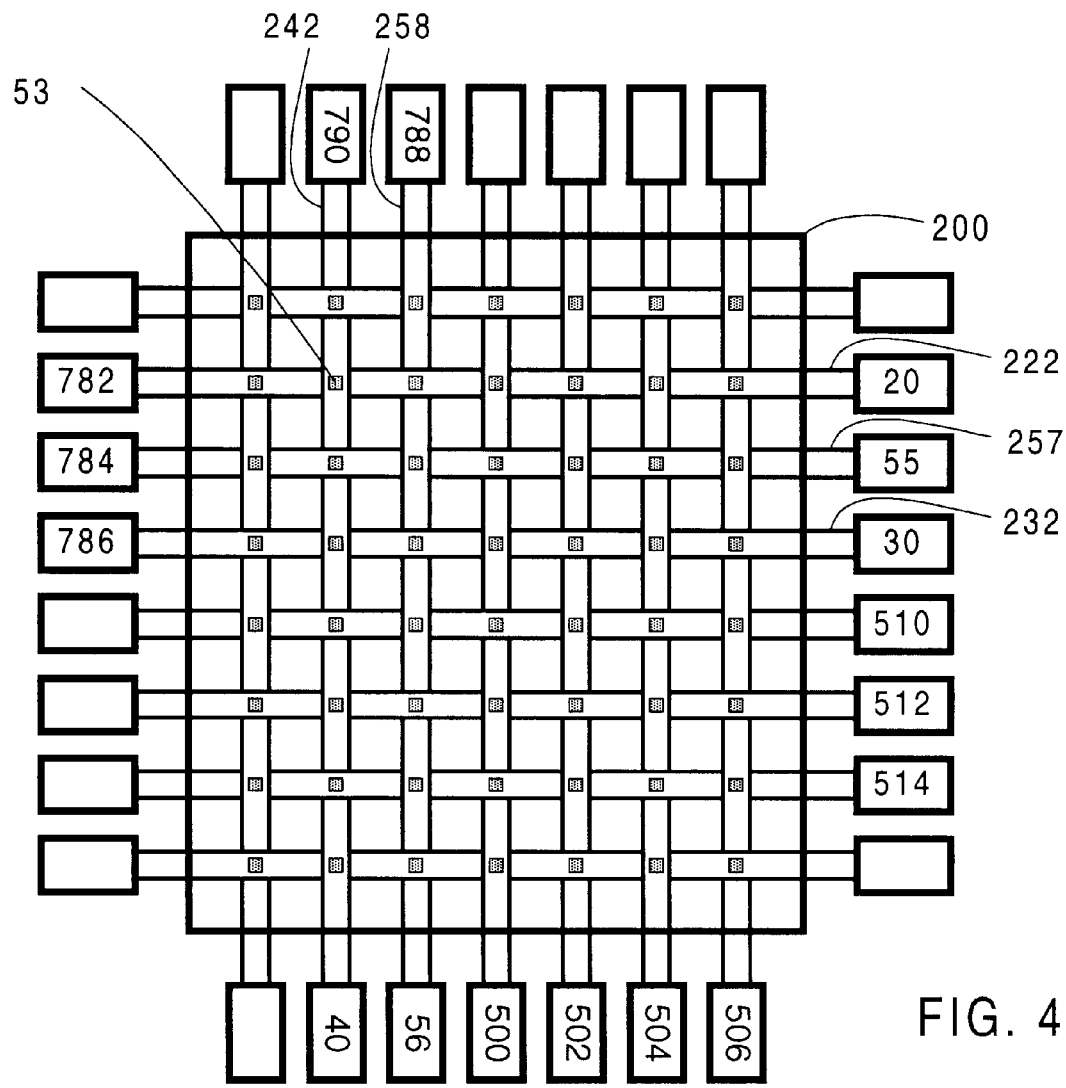
FIG. 4 shows a panel of display fabric having a plurality of parallel fiber optic threads woven orthogonal to another plurality of parallel fiber optic threads, wherein pixels of light are generated by imaging phosphor at intersections of the threads.

FIG. 4 shows a panel of display fabric having a plurality of parallel fiber optic threads woven orthogonal to another plurality of parallel fiber optic threads, wherein pixels of light are generated by imaging phosphor at intersections of the threads. Display panel 200 is comprised of a multiplicity of substantially parallel fiber optic wave guides, including 222, 232 and 257, orientated orthogonal to a second multiplicity of substantially parallel fiber optic wave guides, including 242 and 258. Light generating pixels occur at intersections of the fiber optic threads, such as pixel 53, resulting from a light emitting phosphor being charged and triggered by energy beam sources 20 and 40 as previously described.

Figure 5:
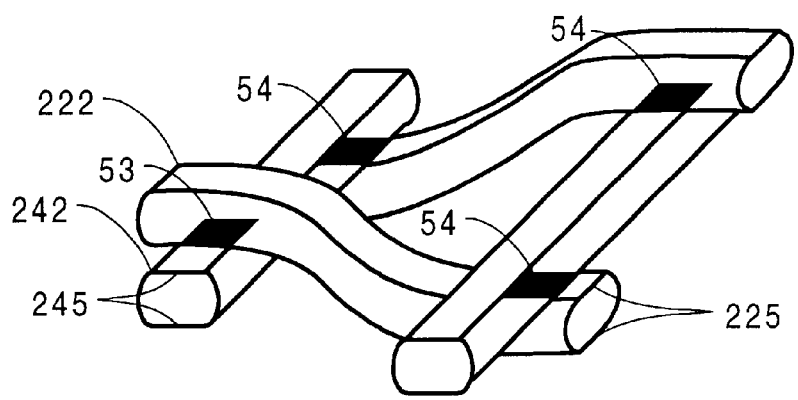
FIG. 5 shows a perspective view of the display fabric panel of FIG. 4.

FIG. 5 shows a perspective view of the display fabric panel of FIG. 4. Pixel 53 is generated by and intersection of energy beams of fiber optic wave guides 242 and 222. Wave guide fiber optic thread 242 has a surface 245 for facilitating intersection of its energy beam with energy beams of orthogonal wave guides such as fiber optic wave guide 222. The remaining surface of fiber optic thread 242 facilitates energy beam internal reflection. Similarly, wave guide fiber optic thread 222 has a surface 225 for facilitating intersection of its energy beam with energy beams of orthogonal wave guides such as fiber optic wave guide 240. The remaining surface of fiber optic thread 240 facilitates energy beam internal reflection Surfaces 245 and 225 may be etched or non-smooth to facilitate energy the intersection of energy beams at pixels 53 and 54. Light emitted from pixels may be generated by illuminating phosphor deposited at the intersection of threads 222 and 242. Alternately either or both fiber optic wave guide threads 222 and 242 may have illuminating phosphor distributed there through. The intersection forming pixels 53 and 54 may be made by a friction fit due to the weaving of flexible fiber optic threads or by fusing the fiber optic threads together at the pixel intersections. Alternately, if a fusing technique is used, a round fiber optic thread may be used, as the fuse between the threads will facilitate the intersection of energy beams of the threads to produce a pixel.

Referring back to FIG. 4, display panel 200 may generate color images by adding compounds to wave guide threads. For example, as previously described, a phosphor radiating a predominant red, green and blue color could be added to wave guide fiber optic threads 222, 257 and 232 respectively. Alternately the wave guides could be tinted, or the corresponding energy beam sources could be modified to modulate the color of a pixel. Furthermore, reflectors could be added an end of each wave guide thread to compensate for energy beam attenuation as previously described.

The panel of FIG. 4 has the advantage of being composed of thin flexible fiber optic threads, and thus as a panel, it is thin and flexible similar to a cloth. Since fiber optic threads are thin, the pixel density of the panel may be relatively high. And as previously described, panel 200 may produce color images. Pixels of panel 200 can radiate light from both sides of the panel. Further, as previously described, energy beam sources 20, 30, 40, 55 and 56 may be solid state diodes, consequently no moving parts are needed to produce an image on panel 200.

Although the wave guides of FIGS. 2, 3, 4 and 5 show a perpendicular orientation between wave guides to form intersections defining pixels, the orthogonal relationship of the wave guides of the contemplated invention is not limited to a perpendicular configuration. The orthogonal relationship of the wave guides include any non-parallel relationship or a relationship between the wave guides which form an intersection such that illuminating phosphor may be radiated by charging and triggering energy beams.

Figure 6:
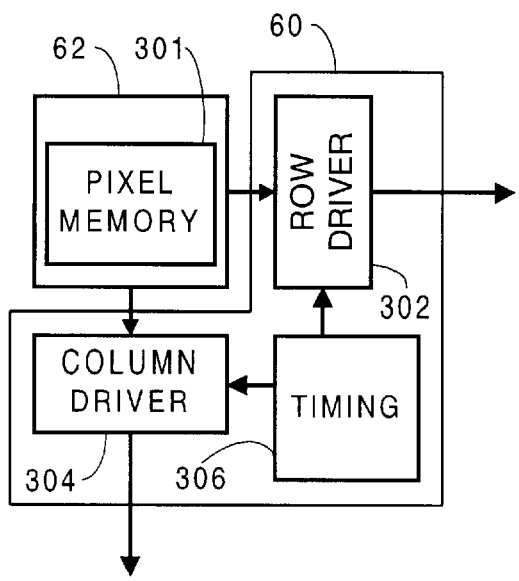
FIG. 6 shows a more detailed block diagram of functions included in a display generator and a switching means operating in accordance with the present invention.

FIG. 6 shows a more detailed block diagram of functions included in display generator 62 and switching means 60 of FIG. 1. Display generator 62 includes a pixel memory 301 which contains pixel brightness signals having numerical values indicative of brightness of pixels to be displayed on a display. Switching means 60 acts as a fundamental component of a pixel brightness control means. Switching means 60 includes a row driver 302 for timing the occurrence of energy beams in rows of the display panel, such as energy beams created by aforementioned sources 20 and 30 with timing information from timing means 306 to generated pixel brightness indicated by the pixel memory. Switching means 60 includes a column driver 304 for timing the occurrence of energy beams in columns of the display panel, such as energy beams created by aforementioned sources 40 and 56 with timing information from timing means 306 to generate pixel brightness indicated by the pixel memory. The timing occurrence of an energy beam may be accomplished in a number of ways including switching the energy beam source off and on, activating a shutter associated with the source or steering an energy beam into and out of the intersection with a beam steering device. In a preferred embodiment, an energy beam radiating a row of the display panel is radiated for a predetermined time. During that predetermined time all of the column energy beams are radiated to cause pixels within the row to be illuminated. The duration of each column energy beam is modulated to set the desired brightness of each pixel of the row. Thereafter, another row energy beam is radiated for the predetermined time and the column energy beams are radiated to set the brightness of each pixel of the row. This process continues until all of the pixels of the display are illuminated, the process then repeats, creating the appearance of a continuously variable moving display on the display panel, similar to the image displayed on a CRT of a computer or television.

Figure 7:
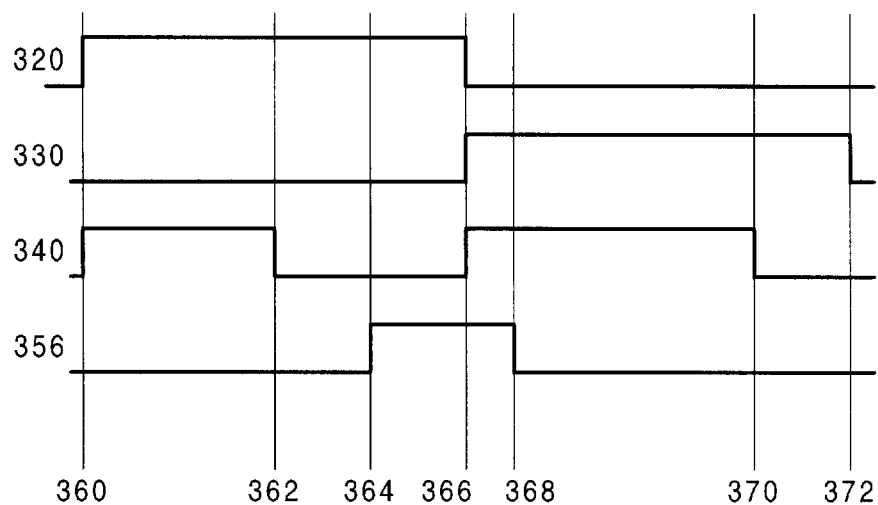
FIG. 7 shows a timing diagram of energy beams driven by the switching means for creating a matrix of four pixels of varying brightness.

FIG. 7 shows a timing diagram of energy beams driven by the switching means for creating a matrix of four pixels of varying brightness. Line 320 indicates that the energy beam from aforementioned source 20 is radiating a first row on the display panel from events 360 to 366. Line 330 indicates that source 30 is off from events 360 to 366. Line 340 indicates that an energy beam from source 40 is radiating a first column on the display panel from events 360 to 362. During this time, a pixel is formed on the display panel at the intersection of energy beams from sources 20 and 40. Line 340 further indicates that an energy beam from source 40 is off for the duration of the energy beam from source 20. The energy beam from source 40 is on for substantially 50% of the time that the column energy beam from source 20. Thus the pixel occurring at the intersection of the two beams from sources 20 and 40 will be substantially half the brightness of the pixel if the beam from source 40 was on for the entire duration of the beam from source 20.

Line 356 indicates the beam from aforementioned source 56 is on and radiating a second column on the display panel from events 364 to 366. During this time, a second pixel is formed on the display panel at the intersection of energy beams from sources 20 and 56. Line 356 further indicates that an energy beam from source 56 is off from events 360 to 364. The energy beam from source 56 is on for substantially 25% of the time that the column energy beam from source 20. Thus the pixel occurring at the intersection of the two beams from sources 20 and 56 will be substantially one quarter the brightness of the pixel if the beam from source 56 was on for the entire duration of the beam from source 20. Thus, the brightness of the aforementioned pixel from source 40 is brighter than said pixel from source 56.

Line 320 further indicates that the energy beam from source 20 is off after event 366. Line 330 indicates that source 30 is radiating a second row on the display panel from events 366 to 372. Line 340 indicates that an energy beam from source 40 is radiating the first column on the display panel from events 366 to 370. During this time, a third pixel is formed on the display panel at the intersection of energy beams from sources 30 and 40. Line 340 further indicates that an energy beam from source 40 is off for the duration of the energy beam from source 30. The energy beam from source 40 is on for substantially 75% of the time that the column energy beam from source 30. Thus the pixel occurring at the intersection of the two beams from sources 30 and 40 will be substantially three fourths the brightness of the pixel if the beam from source 40 was on for the entire duration of the beam from source 30.

Line 356 indicates the beam from an energy beam from source 56 is on and radiating the second column on the display panel from events 366 to 368. During this time, a fourth pixel is formed on the display panel at the intersection of energy beams from sources 30 and 56. Line 356 further indicates that an energy beam from source 56 is off after event 368. The energy beam from source 56 is on for substantially 12.5% of the time that the column energy beam from source 20. Thus the pixel occurring at the intersection of the two beams from sources 30 and 56 will be substantially one eighth the brightness of the pixel if the beam from source 56 was on for the entire duration of the beam from source 20.

FIG. 7 shows energy beam timing control for creating on the display panel four pixels of differing brightness by the intersection of constant intensity energy beams from two column sources and two row sources. In this embodiment, the energy beams from the row sources are periodically radiated at predetermined rates while the timing of the duration of energy beams from the column sources are varied in order to set the desired brightness of each pixel. The number of pixels may be substantially increased by increasing the number of row and/or column energy beams, wherein rows are sequentially, or otherwise, radiated with row energy beams of predetermined duration while variable brightness pixels of the row are created by variable duration radiation from column energy beams. By rapidly repeating timings of the row and column drives, the appearance of a moving image may be created on the display panel.

Figure 8:
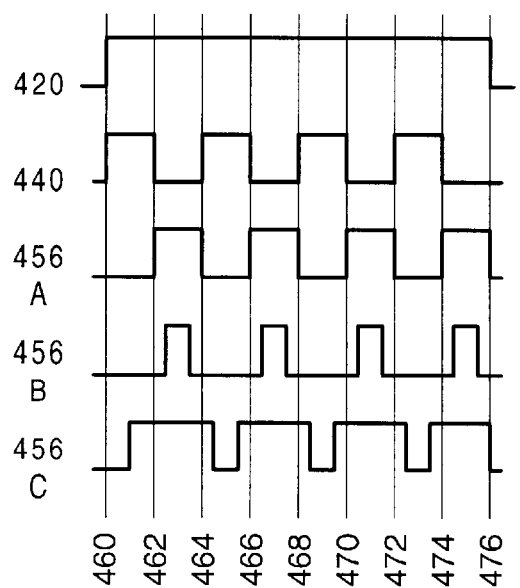
FIG. 8 shows an alternate timing diagram of energy beams driven by the switching means for controlling brightness of two pixels in a pixel matrix.

FIG. 8 shows an alternate timing diagram for controlling brightness of two pixels in a pixel matrix. Line 420 indicates that the energy beam from aforementioned source 20 is radiating a first row on the display panel between events 460 and 476. Line 440 indicates that an energy beam from aforementioned source 40 is radiating a first column on the display panel between events 460–462, 464–466, 468–470, 472–474. During these times, a pixel is formed on the display panel at the intersection of energy beams from sources 20 and 40. The duty cycle of line 440 further indicates that the energy beam from source 40 is on for substantially 50% of the time that the column energy beam from source 20. Thus the pixel occurring at the intersection of the two beams from sources 20 and 40 will be substantially half the brightness of the pixel if the beam from source 40 was on for the entire duration of the beam from source 20.

The pixel generated by energy beams controlled in accord with lines 420 and 440 has a similar brightness to the pixel generated by energy beams of lines 320 and 340 of FIG. 7, except that the illumination of said pixel of FIG. 8 is distributed substantially over the entire duration of the row energy beam of line 420, while said pixel of FIG. 7 is one for the first half of the duration of the row energy beam of line 320.

Lines 456A, 456B and 456C show different energy beam duty cycles for controlling an energy beam from aforementioned source 45. A pixel is generated at the intersection of the row energy beam from source 20 and column energy beam from source 56. The duty cycles are 50%, 75% and 25% respectively. Line 456A is the inverse of line 440 resulting in a pixel at the intersection of energy beams from sources 20 and 56 which is on for 50% of the time and is off while the pixel of FIG. 8 from intersection of energy beams from sources 20 and 40 is on and visa versa. This has the advantages of not only spreading the illumination of the pixel for the duration of the energy beam from source 20 but also operates the pixels in a relatively complementary fashion. Lines 456B and 456C show variations in duty cycle from 75% on to 25% on, respectively, relative to line 456A. The variations in duty cycle vary the duration of occurrence of the energy beam. The corresponding pixel formed at the corresponding intersection would have substantially 75% and 25% brightness.

Thus, FIG. 8 shows an alternate method for controlling the brightness of pixels formed on the display panel using a variable duty cycle on one of the energy beams used to form the pixel. It should be appreciated that while duty cycle variations is described in the intersection of a plurality pixels and a multiplicity of energy beam sources, the method can also be used to govern the brightness of any two energy beams for creating visible light as a result of their intersection.

FIG. 7 and FIG. 8 shows a first source column for radiating a first energy beam through a first portion of the edge for a first duration, a second column source for radiating a second energy beam through a second portion of the edge for a second duration less than the first duration, and a row source for radiating a third energy beam through a third portion of the edge for a third duration inclusive of the first and second durations. The methods of FIG. 7 and FIG. 8 have the advantage of providing for energy beams of constant intensity and variable duration, thereby avoiding the problem of designing energy beams sources capable of producing variable intensity energy beams to control pixel brightness. The methods of FIG. 7 and FIG. 8 describe varying pixel brightness, in the preferred embodiment the pixel brightness is varied in response to pixel brightness signals in the pixel memory. The brightness may additionally be varied in a predetermined way to compensate for bright and dark areas on the display as a result of manufacturing and other process variations.

Returning to FIG. 4, as previously described, a multiple color display "fabric" may be made by including a differing color phosphor in at least two wave guide fiber optic threads of the display fabric. In this way a multitude of colors may be produced by a grouping of pixels of differing colors. It is desirable to keep a common sized wave guide fiber optic thread dimension, or thread thickness. When using the aforementioned row and column drivers of FIG. 6, the resulting pixel grouping is irregularly shaped in that it length is different from its width. For example, a pixel grouping of red, green and blue pixels is formed by the intersection column save guide fiber optic threads of sources 40, 56 and 500, respectively and row wave guide fiber optic threads of source 20. In order to make the pixel grouping uniform in shape, that is the length and width the same, and in order to make the wave guide fiber optic threads of the same thickness, the grouping could be expanded to include an equal number of rows and columns. In a red, green blue (RGB) example, a red pixel is formed by the intersection of any row wave guide with a column wave guide associated with either sources 40 or 502, a green pixel is formed by the intersection of any row wave guide with a column wave guide associated with either sources 56 or 504, and a blue pixel is formed by the intersection of any row wave guide with a column wave guide associated with either sources 500 or 506. A regularly shaped pixel grouping would be made by simultaneously driving sources 20, 55 and 30 as one row and 510, 512 and 514 as another row. In this way, four regularly shaped RGB pixel groupings may be formed from the sources identified in FIG. 8. The first pixel is generated by the intersection of row sources 20, 55 and 30 and RGB column sources 40, 56 and 500. The second pixel is generated by the intersection of row sources 20, 55 and 30 and RGB column sources 502, 504 and 506. The third pixel is generated by the intersection of row sources 510, 512 and 514 and RGB column sources 40, 56 and 500. The fourth pixel is generated by the intersection of row sources 510, 512 and 514 and RGB column sources 502, 504 and 506. The brightness of pixels of the pixel group may be controlled using the aforementioned switching means of FIG. 6.

Thus what is provided is a thin flexible display panel having multi-color light generating pixels which may be viewed from either side of the panel and requires no moving parts to generate the display. Furthermore, what is provided is a method and apparatus for controlling the brightness of pixels comprised within such a display, as well as a way to create regularly dimensioned pixel groupings capable of producing multiple colors with a common sized wave guide.

Figure 9:
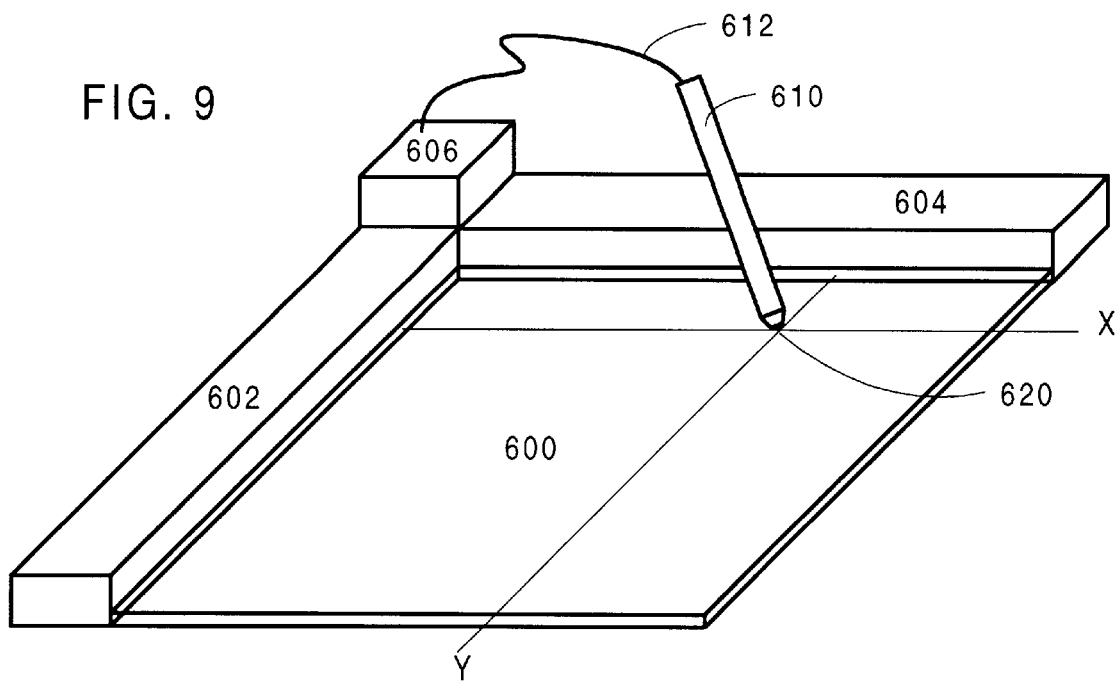
FIG. 9 shows a perspective view of the intersecting beam phosphorous display with a pen-like pointing device.

FIG. 9 shows a perspective view of the intersecting beam phosphorous display with an pen-like pointing device. The display panel 600 is operationally similar to aforementioned display panels 10, 100 or 200. The display panel is driven by row and column sources 602 and 604 which include aforementioned row sources 20, 55, 30, 510, 512 and 514 and the aforementioned column sources column sources 40, 56, 500, 502, 504 and 506. The aforementioned switching means 60 and display generator 62 may be comprised within block 606. A pen-like pointing device 610 is coupled to block 606 with a cable 612. In an alternate embodiment the interface to the pen may be wireless. The pen has a tip which is shown to be in substantial contact with the display 600 at a location 620 having a row and column axis of "X" and "Y" respectively. The row and column axis are also indicative of corresponding row and column energy beams having an intersection substantially at location 620 and the tip of the pen on the display panel.

Figure 10:
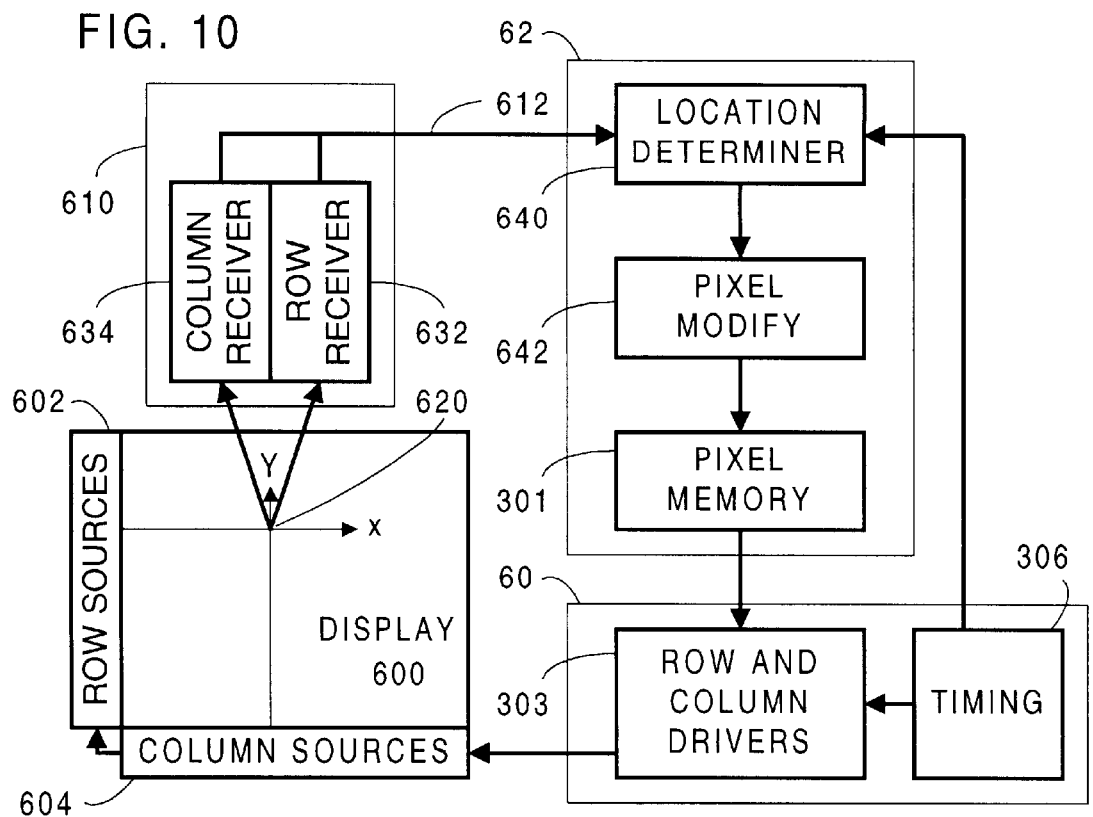
FIG. 10 shows a block diagram of the intersecting beam phosphorous display with the pen-like pointing device.

FIG. 10 shows a block diagram of the intersecting beam phosphorous display with the pen-like pointing device and includes the corresponding items of FIG. 9. Pen 610 has row and column receivers 632 and 634 for receiving energy beams from row and column drivers 602 and 604. Location determining means 640 compares the timing of signals received from the row and column receivers with the timing signals generated by timing means 306 to determine the location of the pen on the display. In response to the determined location, pixel modifier 642 modifies the color and/or brightness of pixels substantially at the determined location resulting in, among other things know in the art, electronic ink. This give the user the impression that the pen 610 is enabling writing on the display 600 in much the same way that a familiar ink pen enables writing on paper.

Figure 11:
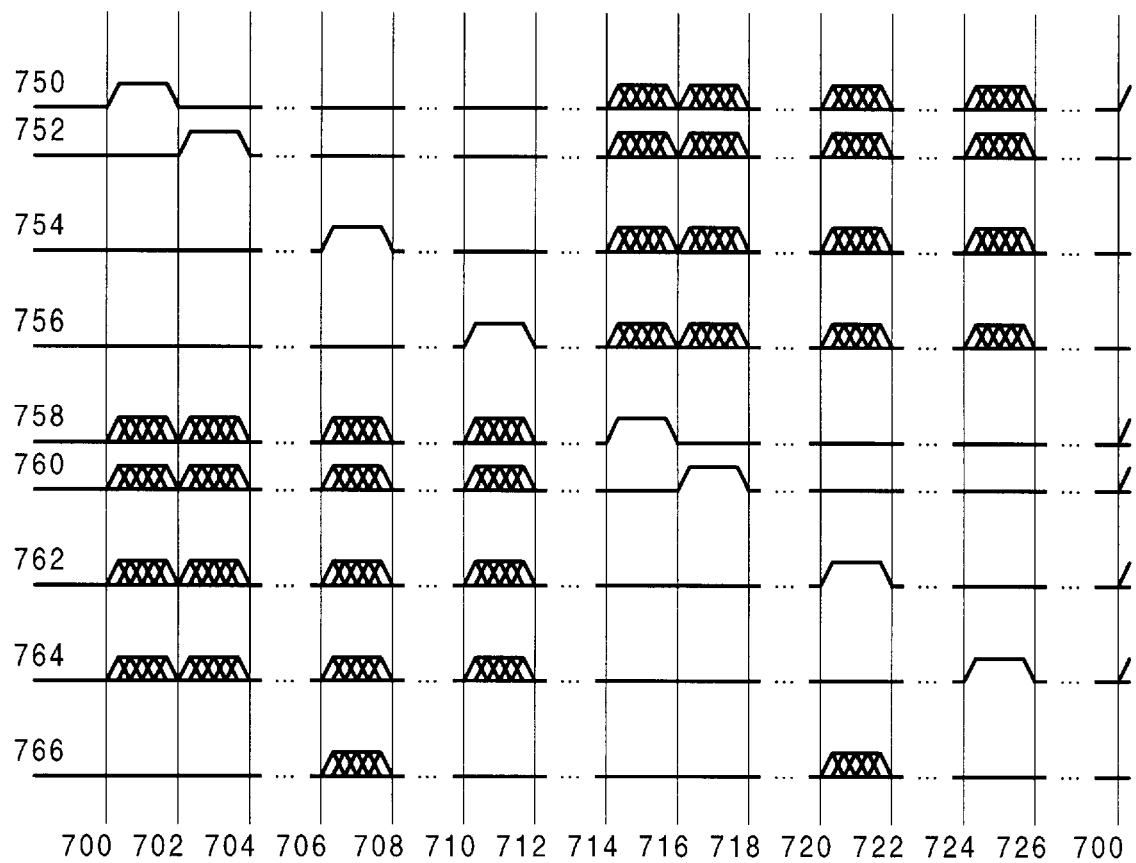
FIG. 11 shows a timing diagram of row and column energy beam radiation as well as pixel illumination in accordance with the present invention.

FIG. 11 shows a timing diagram of row and column energy beam radiation as well as pixel illumination in accordance with the present invention. The events of the timing diagram are indicated by lines 700–726. The row energy beam radiation timing is indicated by lines 750–756, with the row indicated as "X" in FIG. 9 and FIG. 10 indicated by line 754. The column energy beam timing is indicated by lines 758–764, with the column indicated as "Y" in FIG. 9 and FIG. 10 indicated by line 762. The timing of the visual illumination of the pixel at intersection 620 of FIG. 9 and FIG. 10 is shown by line 764.

During events 700–712 the row energy beams 750–756 are sequentially radiated while the column energy beams 758–764 are simultaneously radiated. For example, between events 700 and 702, row energy beam 750 is radiating while the other row energy beams 752–756 are not radiating and all column energy beams 758–764 are simultaneously enable and radiating for a variable duration. Then, between intervals 702 and 704 row energy beam 752 is next in sequence for radiating while the other row energy sources are not radiating and all column energy beams 758–764 are simultaneously enabled and radiating for a variable duration. During events 714–726 the column energy beams 758–764 are sequentially radiated while the row energy beams 750–756 are simultaneously radiated. During sequential radiation, the energy beams are radiated one at a time for a predetermined time. The energy beams may be radiated in a linear sequence from top to bottom or left to right, or in other non-linear sequences which may have the advantage of reducing any appearance of sweeping or flicker of the display. During simultaneous radiation, all energy beams of the row or column are enabled for radiation for a variable duration. As previously described, the duration of the radiation is varied to provide for variable pixel brightness. Variable duration is indicated by the multiple rising and falling lines. Also, during simultaneous radiation, energy beams may be kept off for the variable duration if no visible light is to be generated by the corresponding pixels, as indicated by the always "low" state during the simultaneous radiation mode.

The timing of the visual illumination of the pixel at intersection 620 of FIG. 9 and FIG. 10 is shown by line 764. Line 764 indicates that the pixel is radiating visible light of variable brightness between events 706 and 708 when energy beam 754 is radiated for the predetermined duration and energy beam 762 is radiated for the variable duration. The pixel is also radiating visible light of variable brightness between events 720 and 722 when energy beam 754 is radiating for the variable duration and energy beam 762 is radiating for the predetermined duration.

Referring back to FIG. 10, the operation of the elements of the block diagram are explained with reference to timing diagram of FIG. 11. The row receiver preferably includes a phototransistor optimized for receiving energy beams of the wavelength of energy beams from the row sources and column receiver preferably includes a phototransistor optimized for receiving energy beams of the wavelength from the column sources. In one embodiment the optimization includes an optical filter in front of each phototransistor for passing the desired wavelength. In another embodiment a single receiver can be electronically tuned to receive energy beams of either the row or column wavelengths while either is correspondingly operating in its sequentially driven mode.

Since the row sources are sequentially driven while the column sources are simultaneously driven followed by the column sources being sequentially driven and the row sources simultaneously driven, the location determining mean can determine the location of the pen by matching the generated and received occurrences of row and column sequences. In this mode the row and column receptions while either is in the simultaneous mode are ignored. For example, with the tip of the pen at intersection 620, the row receiver receives a signal having a timing substantially equal to that of line 754 and the column receiver receives a signal having a timing substantially equal to that of line 762. By comparing the received signal timings with the signals generated by the timing means, the location determining means can determine the location of the tip of the pen on the display to be substantially at intersection 620 of energy beams 754 and 762. In determining the location, the location determining means could further approximate for reception of multiple adjacent energy beams by the receivers as well as a predetermined delay between the received and generated signals via system calibration.

Since this form of location determining relies on the reception of the substantially invisible row and column energy beams, the location of the pen may be advantageously determined independent of the pixels illuminated on the display. For example, the location of the pen may be determined when there are no pixels illuminated on the display, because the location is determined by the matching the occurrence of invisible sequential row and column energy beams. Also, since this embodiment does not rely upon visible light for determining location, interference from visible light sources can also be reduced.

In an alternate embodiment, row and column receivers 632 and 634 are replaced by a single visible light receiver (not shown). In this embodiment, the pen tip at location 620 receives the unique visible pixel radiation timing of line 766 of FIG. 11. Since the pixel at line 766 has a unique visible light timing, the location determining means can compare the received signal timing with the signals generated by the timing means in order to determine the location of the tip of the pen on the display. In determining the location, the location determining means could also approximate for reception of multiple adjacent pixel by the receiver as well as a predetermined delay between the received and generated signals via system calibration.

This alternate embodiment has the advantage of requiring only a single visible light receiver and operates in response to illumination of pixels. In an example of this mode, the display would be illuminated as if it were a white page and the pixel modification in response to the determined location of the pen would be displayed as a colored ink.

The invention has the advantage of a method for driving an intersecting beam phosphorous display which facilitates locating a pen-like pointing device on the display. The location is determined by comparing received radiated signals with signals generated in order to drive the display, no additional position sensing is necessary, such as a touch sensitive pad or other means to determine the location of the pointing device. Since the display may be thin flexible glass or plastic with an imaging phosphor, and no active components on either side of the display surface, the display itself is resilient and needs very little protection from damage by the pen. Thus, the geometry of the display allows for a very close proximity between the displayed pixels and the receivers in the pen. This advantage significantly reduces parallax when using the pointing device. Furthermore, receivers of the pen may be similarly positioned very near the tip of the pen, further reducing parallax.

Referring back to FIG. 1, FIG. 1 shows a display apparatus having redundant switching means 780, redundant row sources 782, 784 and 786, and redundant column sources 788 and 790. The operation of the redundant switching means 780 is substantially identical to the operation of switching means 60. Redundant row energy beam sources 782, 784 and 786 operate substantially identically to corresponding row energy sources 20, 55 and 30, all sources radiating invisible energy beams of substantially the same wavelength or frequency however in an opposite directions. Thus, energy beams from sources 20 and 782 radiate along path 22 but in opposite directions, energy beams from sources 55 and 784 radiate along path 57 but in opposite directions and energy beams from sources 30 and 786 radiate along path 32 but in opposite directions. Similarly, redundant column energy beam sources 788 and 790 operate substantially identically to corresponding column energy sources 56 and 40, all sources radiating invisible energy beams of substantially the same wavelength or frequency however in an opposite directions. Thus, energy beams from sources 788 and 56 radiate along path 58 but in opposite directions, and energy beams from sources 790 and 40 radiate along path 42 but in opposite directions.

The redundant elements of FIG. 1 have the advantage of providing for fault tolerant pixel illumination of all pixels 52, 53 and 54 of the display even if one or several components fail. For example if switching means 60 were to fail, causing all energy beams controlled thereby to also fail, the energy beams from the redundant switching means and sources 780–790 would radiate the along paths 22, 32, 42, 57 and 58 to enable pixels 52,53 and 54 to illuminate. Similarly, should individual energy beam sources fail, the corresponding redundant source would continue to radiate an energy beam along the desired path. A similar fault tolerance occurs at an interface between the energy beam source and the display.

Referring back to FIG. 4, FIG. 4 further shows redundant row and column sources used in conjunction with the multiple wave guide display. The redundant row sources include sources 782, 784 and 786. The redundant column sources include sources 788 and 790. It should be appreciated row and column reflectors 92 and 94 of FIG. 2 could also be replace by redundant sources resulting in a benefit similar to the reflectors including a brighter display and more uniform pixel brightness. Also, redundant row and column sources and drivers may be incorporated into the pen pointing device of FIG. 9 without substantial modification to the operation of the pointing system.

Figure 12:
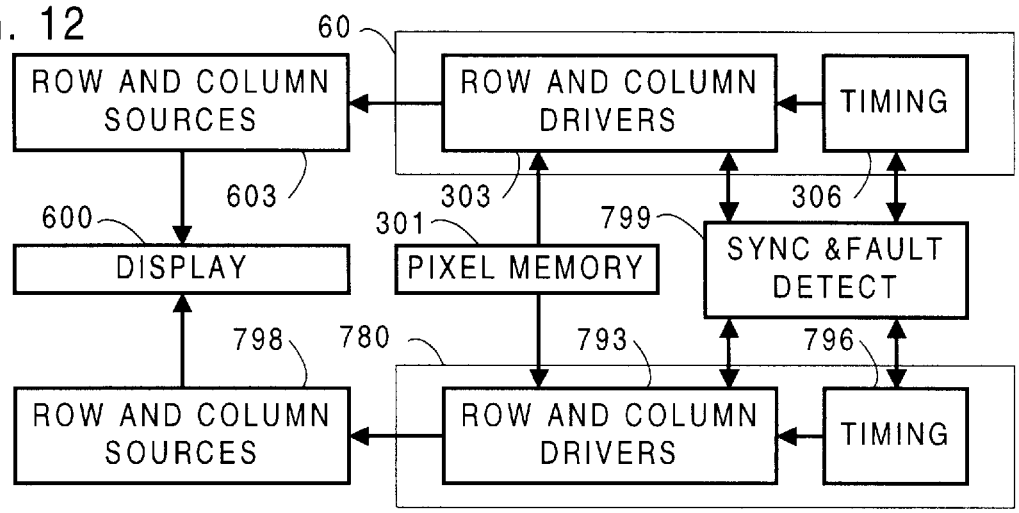
FIG. 12 shows a block diagram of the fault tolerant display system operation in accordance with the present invention.

FIG. 12 shows a block diagram of the fault tolerant display system operation in accordance with the present invention. The switching means 60, pixel memory 301, row and column drivers 303, timing means 306, and display 600 operate substantially identically to the corresponding elements of FIG. 10. The row and column sources 603 include row and column sources 602 and 604 of FIG. 10. The redundant components include switching means 780 having row and column drivers 793 and timing means 796 are coupled to redundant row and column sources 798 which includes aforementioned sources 782–790. The switching means and its components are substantially identical to and operate in substantial synchronization with corresponding switching means 60 and its components in order to illuminate pixels on the display. Synchronization and fault detection means 799 operates to synchronize the two switching means 60 and 780 so that redundant energy beam radiation occurs in substantial synchronization. Means 799 further acts to monitor signals produced by the timing means 306 and 396 and row and column drivers 303 and 793 for signal indicative of a failure of circuitry therein or the energy beam sources. A signal may be generated in response to self check circuits detecting a failure in order that further corrective action may be taken. Further, if a failure causes an energy beam to remain radiating when it is supposed to be off, the source itself, all of the corresponding row or column sources, the corresponding drivers and/or timing means may be deactivated and the display continues to operate with the redundant circuitry. In alternate embodiments, additional redundant components may be added such as power supplies, pixel memories and computer systems used to generate images stored in the pixel memories.

The fault tolerance characteristics of the present invention have the advantage of being easily and inexpensively realized, similar redundant systems are excessively complex and/or expensive to realize in CRT or LCD displays, if at all possible. Further, the display itself is passive having no active components or liquid crystal films thereby further improving the reliability of the display system. The combination of redundant active components driving a passive display panel provides an exceeding reliable color display having in medical, military, aircraft and spacecraft applications where reliability and fault tolerance are essential. Thus what has been provided is a fault tolerant display system having redundant active components and a passive display panel.

I claim:

1. A display apparatus comprising:
    a panel having a display surface surrounded by an edge, said panel further having an illuminating material therein:
    a first source for radiating a first energy beam through a first portion of the edge in a first direction along a first path;
    a redundant source for radiating a redundant energy beam through another portion of the edge in a direction substantially opposite to the first direction and substantially along the first path;
    a third source for radiating a third energy beam through a third portion of the edge,
    wherein a first pixel of visible light energy is released by the illuminating material at an intersection of the first, redundant and third energy beams whereby the first pixel of visible light is released independent of a failure of either the first or redundant energy beam.

2. The display apparatus according to claim 1 wherein the first pixel of visible light has a substantially constant location on the display surface.

3. The display apparatus according to claim 1 further comprising
    a wave guide having a first end for receiving the first energy beam and a second end for receiving the redundant energy beam wherein said wave guide substantially defines the first path and substantially directs the first and redundant energy beams along the first path.

4. The display apparatus according to claim 1 wherein the third energy beam is radiated in a third direction along a third path and the apparatus further comprises
    a third redundant source for radiating a third redundant energy beam through a third other portion of the edge in a direction substantially opposite to the third direction and substantially along the third path,
    further wherein the first pixel of visible light energy is released at the intersection of the first, redundant, third and third redundant energy beams further whereby the first pixel of visible light is released independent of a failure of either said third or said third redundant energy beam.

5. The display apparatus according to claim 1 further comprising:
    a second source for radiating a second energy beam through a second portion of the edge in substantially the first direction along a second path;
    a second redundant source for radiating a second redundant energy beam through a second other portion of the edge in a second direction substantially opposite the first direction and substantially along the second path,
    wherein a second pixel of visible light energy is released by the illuminating material at a second intersection of the second, second redundant and third energy beams whereby the second pixel of visible light is released independent of a failure of either the second or second redundant energy beam.

6. The display apparatus according to claim 5 wherein the third energy beam is radiated in a third direction along a third path and the apparatus further comprises
    a third redundant source for radiating a third redundant energy beam through a third other portion of the edge in a direction substantially opposite the third direction and substantially along the third path,
    further wherein the first pixel of visible light energy is released by the imaging phosphor at an intersection of the first, redundant, third and third redundant energy beams and the second pixel of visible light energy is released at the second intersection of the second, second redundant, third and third redundant energy beams and further whereby the first and second pixels of visible light are released independent of a failure of either said third or said third redundant energy beam.

7. The display apparatus according to claim 6 further comprising:
    a driver means for controlling radiation of the first, second and third energy beams; and
    a redundant driver means for controlling radiation of the redundant, second redundant and third redundant energy beams wherein said redundant driver means is substantially independent of said driver means.

8. The display apparatus according to claim 6 further comprising:
    a timing means for controlling timing of radiation of the first, second and third energy beams;
    a redundant timing means for controlling timing of radiation of the redundant, second redundant and third redundant energy beams wherein said redundant driver means is substantially independent of said driver means; and
    a synchronization means coupled to said timing means and said redundant timing means wherein the first and redundant energy beams have substantially identical timing, and the second and second redundant energy beams have substantially identical timing, and the third and third redundant energy beams have substantially identical timing.

9. The display apparatus according to claim 8 wherein said synchronization means further comprises a fault detection means for determining in inequality in timing between said timing means and said redundant timing means and for generating a fault detection signal in response thereto.

10. A method of driving an intersecting beam display comprising the steps of:

radiating a first energy beam into an intersection;

radiating a redundant energy beam into the intersection; and radiating a third energy beam into the intersection, wherein a first pixel of visible light occurs at the intersection and occurs independent of a failure of either the first or redundant energy beams and further wherein the intersection includes an illuminating material for converting the energy beams of the first and second wavelengths into light of a visible wavelength.

11. The method according to claim 10 wherein the first and redundant energy beams have a substantially common and invisible first wave length, the third energy beam has a substantially invisible second wavelength, and the first pixel has a substantially.

12. The method according to claim 10 wherein said step of radiating the first energy beam includes the step of radiating the first energy beam in a first direction along a first path, and said step of radiating the redundant energy beam includes the step of radiating the redundant energy beam in a direction opposite the first direction and along the first path.

13. The method according to claim 10 further comprising the step of radiating a second energy beam into a second intersection of the second and third energy beams, the second intersection having a location different from a location of the first intersection, wherein a second pixel of visible light occurs at the second intersection.

14. The method according to claim 10 further comprising the step of radiating a third redundant energy beam into the intersection, further wherein the first pixel of visible light occurs at the intersection and occurs independent of a failure of either the third or third redundant energy beams.

15. A method of driving an intersecting beam display comprising the steps of:

radiating a first energy beam into an intersection;

radiating a redundant energy beam into the intersection; and radiating a third energy beam into the intersection, wherein a first pixel of visible light occurs at the intersection and occurs independent of a failure of either the first or redundant energy beams and further wherein the first and redundant energy beams have a substantially common and invisible first wave length, the third energy beam has a substantially invisible second wavelength, and the first pixel has a substantially visible wavelength.

16. The method according to claim 15 wherein the intersection includes an illuminating material for converting the energy beams of the first and second wavelengths into light of a visible wavelength.

17. The method according to claim 15 wherein said step of radiating the first energy beam includes the step of radiating the first energy beam in a first direction along a first path, and said step of radiating the redundant energy beam includes the step of radiating the redundant energy beam in a direction opposite the first direction and along the first path.

18. The method according to claim 15 further comprising the step of radiating a second energy beam into a second intersection of the second and third energy beams, the second intersection having a location different from a location of the first intersection, wherein a second pixel of visible light occurs at the second intersection.

19. The method according to claim 15 further comprising the step of radiating a third redundant energy beam into the intersection, further wherein the first pixel of visible light occurs at the intersection and occurs independent of a failure of either the third or third redundant energy beams.

* * * * *